July 20, 1954  J. B. CATALDO  2,684,470
ELECTRICAL FIXTURE FOR FLAT TWIN ELECTRICAL CONDUCTORS
Filed April 16, 1952
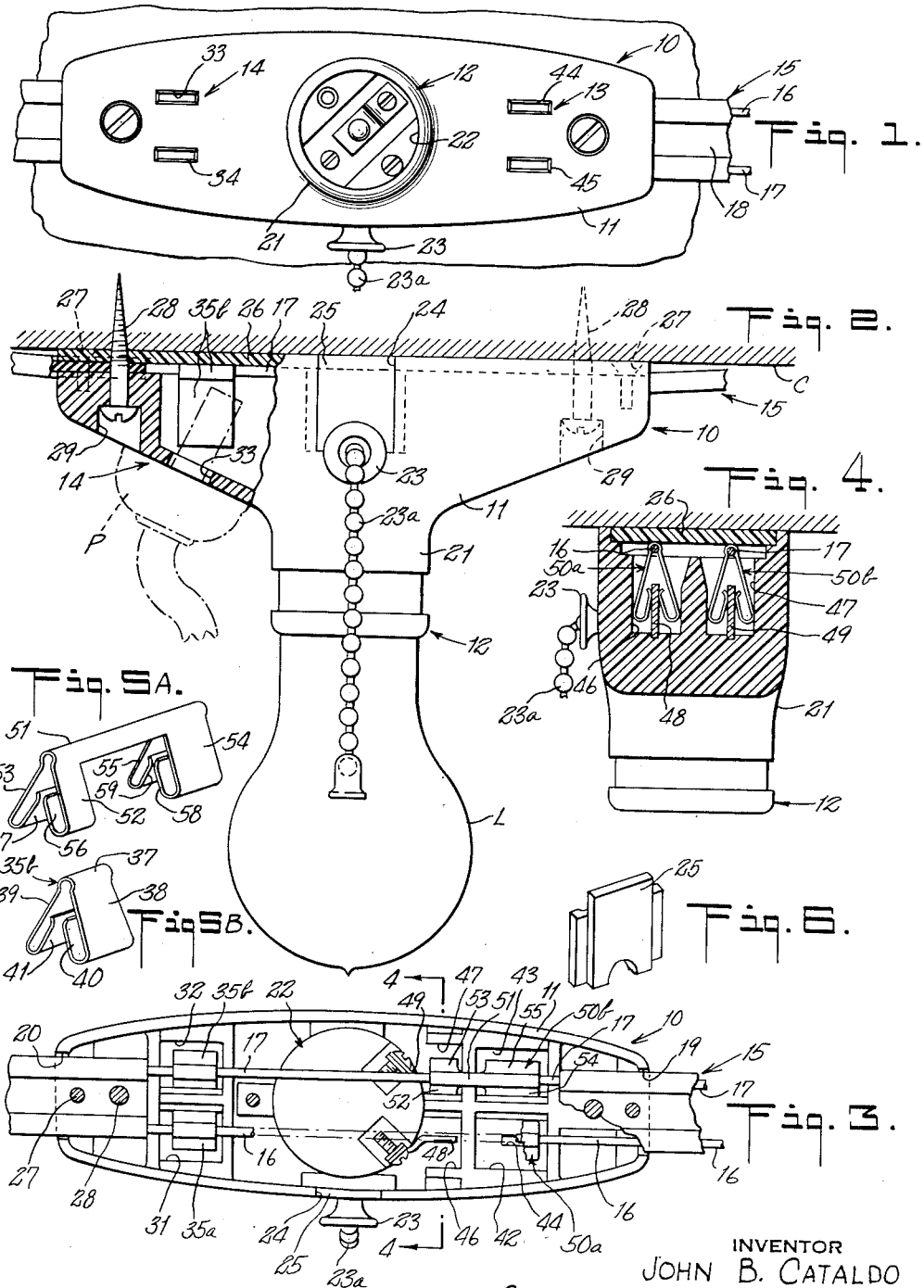
INVENTOR
JOHN B. CATALDO
BY
Campbell, Brumbaugh, Free & Graves
ATTORNEYS Patented July 20, 1954

2,684,470

UNITED STATES PATENT OFFICE 2,684,470

ELECTRICAL FIXTURE FOR FLAT TWIN ELECTRICAL CONDUCTORS

John B. Cataldo, Bernardsville, N. J., assignor to John B. Pierce Foundation, New York, N. Y., a corporation of New York Application April 16, 1952, Serial No. 282,616

4 Claims. (Cl. 339—159)

This invention relates to electrical fixtures, and more particularly to new and improved fixtures incorporating lamp sockets, cord plug receptacles and the like.

The development of strip wiring systems comprising semi-rigid electrical conduits of flat, strip form and to which there are connected a series of electrical fixtures, has resulted in a need for fixtures which are particularly adapted for this use. Such fixtures should be so designed that electrical connections can be quickly and effectively established to the electrical conductors of the conduit, preferably without severing the electrical conductors. Further, the usefulness of such fixtures is materially increased when the design is such that a given fixture may be utilized for a plurality of functions, such, for example, as a socket for a lamp and a receptacle for cord plugs.

Accordingly, it is one object of this invention to provide an improved electrical fixture adapted to be attached to an electrical conduit.

It is another object of the invention to provide a unified electrical fixture embodying multiple electrical devices and which may be readily attached to an electrical conduit.

It is a further object of the invention to provide an improved electrical fixture which may be attached intermediately of the ends of a conduit, the electrical conductors of which need not be severed within the fixture.

These and other objects and features of the invention may be attained by providing a housing portion through which the unsevered conductors of an electrical conduit may pass. Within the housing an electrical device such as a conventional lamp socket may be seated with its base adjacent the conductors and provided with terminal blades disposed in suitable recesses so that spring clip members may be utilized to connect the conductors to the terminal blades. Further, a plug receptacle may be so disposed in the fixture that the clip members which join the conductors and the terminal blades may also be utilized to provide contact channels for receiving the male conductor blades of a cord cap plug in an efficient electrical connection.

For a better understanding of the present invention, reference may be had to the following specification taken in conjunction with the drawings illustrating one preferred form of the invention and in which:

Fig. 1 is a top view of an electrical fixture showing lamp socket and receptacle portions;

Fig. 2 is a side view partly in longitudinal section of the fixture shown in Fig. 1;

Fig. 3 is a bottom view of the fixture with the bottom cover piece removed;

Fig. 4 is a view in transverse section taken on the line 4—4 of Fig. 3 looking in the direction of the arrows;

Fig. 5A is a view in perspective of one electrical clip element utilized in the electrical fixture;

Fig. 5B is a view in perspective of another clip element; and

Fig. 6 is a view in perspective of a detachable side portion utilized to facilitate the mounting of the electrical socket in the fixture.

Referring to the drawing, the invention is shown as embodied in an electrical fixture 10 comprising a housing shell 11 formed of insulating material such, for example, as molded plastic. The fixture 10 includes a central lamp socket assembly indicated generally by the numeral 12 and a pair of cord plug receptacles 13 and 14, respectively, disposed on opposite sides of the lamp socket.

The fixture is adapted to be attached to an electrical strip conduit 15, including a pair of heavy electrical conductors 16 and 17 embedded in an insulating strip 18. The conduit 15 is received in suitable channels 19 and 20 formed on opposite ends of the housing 11, and within the housing between these channels the insulation is removed to bare the conductors 16 and 17, which pass through the fixture without being severed.

The housing 11 is formed with an enlarged cylindrical center portion 21 within which the socket assembly 12 is received. The socket assembly 12 includes a conventional, internally threaded receptacle 22 for a lamp bulb L and a laterally extending, flanged pull chain guide 23 entered by a pull chain 23a. Pull chain sockets of this type are well known and need not be described in detail herein.

The housing shell 11 is formed with a slot 24 which receives the pull chain guide 23, the slot being closed behind the guide by means of a slide panel 25 which serves to anchor the socket assembly in place. A bottom cover portion 26 is adapted to overlie the base of the housing shell 11 and when in position secures the slide panel 25 against withdrawal. The cover portion 26 is preferably secured to the housing shell 11 by means of mounting screws 27 (Fig. 2) which may, if desired, penetrate the insulating strip 18 of the electrical conduit 15.

The fixture 10 is adapted to be attached to a supporting surface, such for example as the ceiling C, by means of mounting screws 28 which enter recesses 29. The mounting screws 28 may also be positioned so that they penetrate the insulating strip 18 of the electrical conduit 15 so as to prevent the insulation from being accidentally stripped back to expose the conductors 16 and 17 externally of the fixture.

The housing shell 11 is formed internally with a pair of recesses 31 and 32 (Fig. 3), at the base of which slot opennigs 33 and 34 (Fig. 1), respectively, are formed, these slots being part of the cord plug receptacle portion 14. Fitted over the conductors 16 and 17, respectively, are a pair of identical clip members 35a and 35b. One of these clip members is shown in detail in Fig. 5B as comprising a bight portion 37 for surrounding the conductor, a pair of divergent leg portions 38 and 39 extending outwardly from the bight, and a pair of reentrant, converging arm portions 40 and 41 which afford a channel for receiving the male conductor blade of a cord plug.

The clip members 35a and 35b are so constructed that when they are forced into the recesses 31 and 32 the leg portions 38 and 39 are compressed to cause the bight 37 to grip tightly about the electrical conductor 17 and to cause the arm portions 40 and 41 to engage each other resiliently so as to establish wiping engagement with the male blade of a cord cap plug P as shown in phantom lines in Fig. 2.

To the right of the socket assembly 12, as viewed in Fig. 3, the housing 11 is formed with a second pair of recesses 42 and 43 having slots 44 and 45, which are part of the cord plug receptable 13, at their respective bases. To the left of the recesses 42 and 43 the housing is formed with another pair of recesses 46 and 47 and within these recesses are disposed, respectively, terminal blades 48 and 49 which are carried by the lamp socket 12 and which comprise the terminals thereof.

A single clip member may be utilized to connect one terminal of the lamp socket assembly as well as one terminal of the cord plug receptacle 13 to one conductor of the electrical conduit 15. To this end a pair of double clip members 50a and 50b may be provided, one of which is shown in detail in Fig. 5A as including an elongated bight or fold edge 51 from which extend two pairs of divergent leg portions 52—53 and 54—55. The free ends of the leg portions 52—53 and 54—55 are inturned to provide resilient contact arms 56—57 and 58—59, respectively.

As seen in Fig. 3, the double clip member 50b is shown attached to the conductor 17, while the conductor 16 and part of its corresponding clip member 50a are shown partly broken away to reveal the slot 44 for receiving a blade of a cord cap plug and the terminal blade 48 of the lamp socket. The double clip member 50b is inserted in the housing so that the leg portions 52—53 are compressed in the recess 47 and the leg portions 54—55 are compressed in the recess 43. When so inserted the bight portion 51 will be caused to tightly grip the conductor 17 and the inturned arms 56—57 to tightly engage the terminal blade 49 of the socket assembly 12. The inturned leg portions 58—59 will present a contact channel for receiving the blade or male conductor of a cord cap plug.

It will be seen that the terminal blades 48 and 49 of the socket assembly are constructed and arranged to be disposed directly beneath the electrical conductors 16 and 17, respectively. Thus, for example, the conductor 17, the clip member 50b attached thereto, the slot 45 of the cord cap plug receptacle 13 and the terminal blade 49 are all contained in the same plane. This arrangement coupled with semi-rigid characteristics of the conductor 17 when received within the fixture and the orientation of the recesses 43 and 47 enables the clip member 50b to be quickly and easily installed to establish an electrically and mechanically efficient connection. The cover portion 26, when attached to the housing, overlies the bight portion 51 of each of the clip members to secure the assembly so that forcing a male conductor blade of a cord cap plug through the slot 45 and between the spring-biased contact arms 58—59 will not derange the assembly. As stated, the cover portion 26 also holds the slide panel 25 in place so that the housing shell may carry some of the forces applied to the pull chain guide 23. Also, the pull chain guide 23, since it is laterally confined in the slot 24 formed in the side of the housing shell, will serve together with other mounting connections for the socket assembly, to carry torsional forces which might be applied to the fixture in tightening or loosening an electric lamp in the socket.

It will be understood that additional electrical devices may, within the scope of the present invention, be incorporated in the housing either by means of individual clip members or by extensions formed on multiple purpose clip members. Thus other forms and arrangements of the invention will be apparent to those skilled in the art and the invention should not, therefore, be thought of as limited except as defined by the following claims.

I claim:

1. In an electrical fixture for attaching to an electrical conduit comprising parallel, laterally spaced-apart electrical conductors embedded in a unitary insulating strip, the conductors being at least partially bared of insulation within the fixture, a housing, wall means defining a channel in the base of the housing for receiving the conduit, an electrical device mounted in the housing, a pair of contact terminal blades connected electrically to the device, means forming a pair of slots in the housing for receiving the male conductor blades of a cord cap plug, and electrically conducting clip members for joining both the terminal blades and cord cap plug blades to the electrical conductors of conduit, at least one clip member being provided for each conductor of the conduit and each clip member comprising a bight portion for embracing a conductor, a first portion including leg portions extending outwardly from the bight and carrying contact portions for resiliently engaging a terminal blade of the device, and a second portion also including leg portions extending outwardly from the bight and carrying contact portions defining a channel for receiving the male conductor blade of a cord cap plug.

2. In an electrical fixture for attaching to an electrical conduit comprising parallel, laterally spaced-apart electrical conductors embedded in a unitary insulating strip, the conductors being at least partially bared of insulation within the fixture, a housing, wall means in the base of the housing defining an open channel for receiving the conduit, means forming a slot in the side of the housing having an open end at the base of the housing, a lamp socket mounted in the housing and having a laterally extending pull chain guide received in and projecting through the slot, said socket being mounted in the housing by insertion through the base with the pull chain guide entering by way of the open end of the slot, means forming slots in the surface of the housing for receiving the male conductor blades of cord cap plugs, at least a pair of terminal blades carried by the lamp socket disposed respectively in the planes of electrical conductors of the conduit which pass through the housing, and a plurality of electrically conducting clip members, each clip member being adapted both to connect a terminal blade to an electrical conductor and to provide a resilient contact-channel for receiving a blade of a cord cap plug, each clip member comprising a bight portion for surrounding a conductor, a first portion for engaging a terminal blade including a pair of leg portions extending outwardly from the bight portion and contact portions carried thereby defining a channel for receiving a terminal blade and a second portion including a pair of leg portions extending outwardly from the bight portion and contact portions carried thereby defining a channel for receiving a cord cap blade introduced through one of said slots, and a cover portion attached to the base of the housing to cover the conduit and to block the pull chain guide in position in the housing, the cover portion having an inner surface disposed adjacent the bight portions of the clip members.

3. In an electrical fixture incorporating cord cap plug and lamp socket devices, the fixture being adapted to attach to an electrical conduit comprising parallel, laterally spaced-apart electrical conductors embedded in a unitary insulating strip, the conductors being at least partially bared of insulation for a length to be received within the fixture, a housing shell formed of insulating material, wall means defining in the base of the housing a channel for receiving the electrical conduit, slots formed in the outer surface of the housing shell for receiving the male conductors of cord cap plugs, said slots being orientated to receive the male conductors when the latter are disposed respectively in planes containing the conductors of the conduit, wall means in the housing shell defining recesses opening near the base of the housing shell and communicating with the said slots, means defining an area in the housing shell for receiving the lamp socket device, the base of the lamp socket device being disposed near the base of the housing shell, a pair of terminal blades connected electrically to said lamp socket device and having contact portions disposed respectively in the said planes containing the electrical conductors of the conduit and the slots, means defining recesses in the housing shell embracing said terminal blades, electrically conducting clip members adapted to be received in the recesses and to engage the electrical conductors of the conduit, each of said clip members comprising a bight portion adapted to surround one conductor, a first pair of leg portions extending outwardly from the bight portion to enter a recess corresponding to a slot of a cord cap plug receptacle, inturned converging arm portions carried by the first pair of leg portions to define a contact channel for receiving a male conductor of a cord cap plug which may be inserted in the slot, a second pair of leg portions extending outwardly from the bight portion and spaced from the first pair along the length of the conductor to enter a recess to embrace a terminal blade of the lamp socket device, said leg portions carrying inturned converging arm portions for engaging the terminal blade, and a cover portion adapted to be attached to the housing, the cover portion having an inner surface disposed adjacent the bight portions of the clip members.

4. In an electrical fixture incorporating cord cap plug and lamp socket devices, the fixture being adapted to attach to an electrical conduit comprising parallel, laterally spaced-apart electrical conductors embedded in a unitary insulating strip, the conductors being at least partially bared of insulation for a length to be received within the fixture, a housing shell formed of insulating material, wall means defining in the base of the housing a channel for receiving the electrical conduit, slots formed in the outer surface of the housing shell for receiving the male conductors of cord cap plugs, said slots being orientated to receive the male conductors when the latter are disposed respectively in planes containing the conductors of the conduit, wall means in the housing shell defining recesses opening near the base of the housing shell and communicating with the said slots, means defining an area in the housing shell for receiving a lamp socket device having a laterally extending pull chain guide, the side wall of the housing being slotted to receive the said guide, a slide panel received in the slot behind the guide, the base of the lamp socket device being disposed near the base of the housing shell, a pair of terminal blades connected electrically to said lamp socket device and having contact portions disposed respectively in the said planes containing the electrical conductors of the conduit and the slots, means defining recesses in the housing shell embracing said terminal blades, electrically conducting clip members adapted to be received in the recesses and to engage the electrical conductors of the conduit, each of said clip members comprising a bight portion adapted to surround one conductor, a first pair of leg portions extending outwardly from the bight portion to enter a recess corresponding to a slot of a cord cap plug receptacle, inturned converging arm portions carried by the first pair of leg portions to define a contact channel for receiving a male conductor of a cord cap plug which may be inserted in the slot, a second pair of leg portions extending outwardly from the bight portion and spaced from the first pair along the length of the conductor to enter a recess to embrace a terminal blade of the lamp socket device, said leg portions carrying inturned converging arm portions for engaging the terminal blade, and a cover portion adapted to be attached to the housing, the cover portion having an inner surface disposed adjacent the bight portions of the clip members and overlying the slide panel.

References Cited in the file of this patent

UNITED STATES PATENTS

| Number | Name | Date |
|---|---|---|
| 752,834 | Fielding | Feb. 23, 1904 |
| 1,965,170 | Benjamin | July 3, 1934 |
| 2,194,905 | Johnson | Mar. 26, 1940 |
| 2,313,452 | O'Brien | Mar. 9, 1943 |
| 2,567,961 | O'Brien | Sept. 18, 1951 |

FOREIGN PATENTS

| Number | Country | Date |
|---|---|---|
| 120,441 | Switzerland | May 16, 1927 |